(12) United States Patent
Brouwer et al.

(10) Patent No.: US 10,282,340 B2
(45) Date of Patent: May 7, 2019

(54) PIN-CONFIGURABLE INTERNAL BUS TERMINATION SYSTEM

(71) Applicant: The Boeing Company, Chicago, IL (US)

(72) Inventors: Todd B. Brouwer, Duvall, WA (US); Sean M. Ramey, Lynnwood, WA (US); Timothy E. Jackson, Mukilteo, WA (US); Edgar L. von Trotha, III, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1176 days.

(21) Appl. No.: 14/573,322

(22) Filed: Dec. 17, 2014

(65) Prior Publication Data

US 2016/0179737 A1 Jun. 23, 2016
US 2017/0286350 A9 Oct. 5, 2017

(51) Int. Cl.
*H03K 17/16* (2006.01)
*G06F 13/42* (2006.01)
(Continued)

(52) U.S. Cl.
CPC ...... *G06F 13/4221* (2013.01); *G06F 13/4022* (2013.01); *G06F 13/4068* (2013.01);
(Continued)

(58) Field of Classification Search
CPC ...... G06F 13/385; G06F 1/3253; G06F 1/266; G06F 13/4282; G06F 1/3287; Y02D 10/171; Y02D 10/151; Y02D 10/14
(Continued)

(56) References Cited

U.S. PATENT DOCUMENTS 5,961,619 A * 10/1999 Voloshin ............... G06F 13/00
                                                    326/30
2002/0184426 A1  12/2002 Otsuka
(Continued)

FOREIGN PATENT DOCUMENTS

EP          2166717 A1      3/2010

OTHER PUBLICATIONS

European Patent Office; Extended European Search Report for European Patent Application No. 15199097.5 dated Jun. 8, 2016, 5 Pages.

*Primary Examiner* — Don P Le
(74) *Attorney, Agent, or Firm* — Sage Patent Group

(57) ABSTRACT

A pin-configurable bus termination system may include a bus connector attached to an end of a bus. The bus connector may be configured for electrically connecting the bus to an input connector of a node. The node may include a bus termination resistance. The bus connector may include a first bus output pin, a second bus output pin and configurable first and second termination resistor pins. The configurable first and second termination resistor pins may be configurable to provide a first termination configuration and a second termination configuration. The first termination configuration may electrically interconnect the first and second bus output pins and the configurable first and second termination resistor pins to electrically connect the bus termination resistance for terminating the bus. The second termination configuration may include an open electrical circuit between the first and second bus output pins and the configurable first and second termination resistor pins.

20 Claims, 3 Drawing Sheets

(51) Int. Cl.
*G06F 13/40* (2006.01)
*H04L 12/40* (2006.01)

(52) U.S. Cl.
CPC .... *G06F 13/4086* (2013.01); *H04L 12/40013* (2013.01); *H04L 12/40078* (2013.01); *H04L 12/40189* (2013.01); *H04L 2012/4028* (2013.01); *H04L 2012/40215* (2013.01)

(58) Field of Classification Search
USPC .......................................................... 326/21
See application file for complete search history.

(56) References Cited

U.S. PATENT DOCUMENTS

| | | | |
|---|---|---|---|
| 2004/0161966 A1* | 8/2004 | Benson | H01R 13/641 439/489 |
| 2006/0109598 A1* | 5/2006 | McLeod | H04L 12/40032 361/62 |
| 2007/0120574 A1* | 5/2007 | Houston | H04L 25/0298 326/30 |
| 2008/0114920 A1* | 5/2008 | Watanabe | H04L 12/40032 710/316 |
| 2008/0136444 A1 | 6/2008 | Fahrbach et al. | |
| 2010/0030934 A1 | 2/2010 | Bruennert | |
| 2010/0262729 A1 | 10/2010 | Gaskins | |
| 2012/0231663 A1 | 9/2012 | Dozier | |
| 2014/0097679 A1* | 4/2014 | Saumer | H04L 12/40045 307/18 |
| 2015/0301528 A1* | 10/2015 | Fredriksson | A63H 30/04 701/2 |
| 2019/0018817 A1* | 1/2019 | Williams | H04L 12/40 |

\* cited by examiner

PIN-CONFIGURABLE INTERNAL BUS TERMINATION SYSTEM

FIELD

The present disclosure relates to data communications buses, and more particularly to pin-configurable internal bus termination system for use with data communications buses onboard an airplane or other vehicle and method for configuring connector pins for connecting termination resistors to form a termination resistance.

BACKGROUND

Modern aircraft are complex devices that include multiple different systems. Many of these systems may be electrically interconnected for transmitting data and for controlling the different systems. The electrical interconnections between aircraft systems may include multiple buses with hundreds of wire interconnections. For example, a Boeing 787 currently has 134 Controller Area Network (CAN) buses that interconnect data bus gateways and hundreds of line replaceable units (LRUs) representing hundreds of wire connections. A CAN bus is a linear multi-drop bi-directional data bus conforming to international. Standard ISO-11898. Each unit on the bus (system or LRU) may referred to as a node. Originally intended to support automotive applications, CAN buses may also be utilized in aerospace applications because of their cost effective and efficient networking capability for Line Replaceable Units (LRU's) that may share data across a common media. Typical CAN bus wiring is a 120 ohm shielded-twisted pair, identified as CAN-High (CAN-H) wire or line, CAN-Low (CAN-L) wire or line, with a CAN Shield (CAN-SHLD) wire or conductor. A CAN bus is terminated at each physical extreme end (e.g. the very end of the bus or last node on the bus) by a 120 ohm resistor for proper operation of the CAN bus. The resistor connects the CAN-H wire and CAN-L wire or high and low lines of the CAN bus to reduce signal reflections while providing a load for CAN transceivers to drive a signal. A current common arrangement or method for adding termination resistors on an airplane CAN bus is to splice a 1.5 meter wire stub at the physical extreme ends of the CAN bus. Each stub has a 120 ohm termination resistor at one end. These stubs are labor intensive to create due to the termination resistor and wire splice on the main bus. Furthermore, the wire splice and resistor add weight and must be coiled and stowed on the airplane. There can be hundreds of such terminations onboard a commercial airplane. These, terminations also add an additional component that can fell and is difficult to test in that most CAN buses do not provide direct access.

SUMMARY

In accordance with an embodiment, a pin-configurable bus termination system may include a bus connector attached to an end of a bus. The bus connector may be configured for electrically connecting the bus to an input connector of a node. The node may include an internal bus termination resistance (which may be referred to herein also as a termination resistor) that may be optionally chosen based on a selected configuration of the bus connector. The bus connector may include a first bus output pin, a second bus output pin and configurable first and second termination resistor pins. The configurable first and second termination resistor pins may be configurable to provide a first termination configuration and a second termination configuration. The first termination configuration may electrically interconnect the first and second bus output pins and the configurable first and second termination resistor pins to electrically connect the internal bus termination resistor for terminating the bus. The second termination configuration, for use on nodes not at a physical end of the bus, may include an open electrical circuit between the first and second bus output pins and the configurable first and second termination resistor pins, thereby removing the bus termination resistor from the bus circuit.

In accordance with another embodiment, a pin-configurable bus termination system may include a bus connector attached to an end of a bus. The pin-configurable bus termination system may also include a node that includes a first bus input conductor, a first termination resistor, a second bus input conductor, a second termination resistor and an input connector. The input connector of the node may be configured to receive the bus connector for connecting the bus to the node. The input connector of the node may include a first bus input pin and a first termination resistor input pin. The first bus input pin is electrically connected to the first bus input conductor. The first-termination resistor may be electrically connected between the first termination resistor input pin and the first bus input conductor. The input connector of the node may also include a second bus input pin and a second termination resistor input pin. The second bus input pin is electrically connected to the second bus input conductor. The second termination resistor may be electrically connected between the second termination resistor input pin and the second bus input conductor. The bus connector may include a first bus output pin, a second bus output pin and configurable first and second termination resistor output pins. The configurable first and second termination resistor output pins may be configurable to provide a first termination configuration and a second termination configuration. The first termination, configuration electrically interconnects the first and second, bus output pins and the configurable first and second termination resistor output pins to electrically connect, the first and second termination resistors for terminating the bus. The second termination configuration may provide an open electrical circuit between the first and second bus output pins and the configurable first and second termination resistor output pins.

In accordance with a further embodiment, a method for configuring termination of a bus may include electrically connecting a first internal termination resistor between a first termination resistor pin of an input connector of a node and a first bus input conductor of the node. The method may also include electrically connecting a second internal termination resistor between a second termination resistor pin of the input connector and a second bus input conductor of the node. The method may additionally include determining if the node is located at an end of the bus. The method may additionally include configuring a bus connector to provide a first termination configuration in response to the node being located at the end of the bus. The first termination configuration may include electrically interconnecting configurable first and second termination resistor pins and first and second bus output pins of the bus connector. The method may further include configuring the bus connector to provide a second termination configuration in response to the node not being located at the end of the bus. The second termination configuration may include providing an open electrical circuit between the first and second bus output pins and the configurable first and second termination resistor pins.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1A:
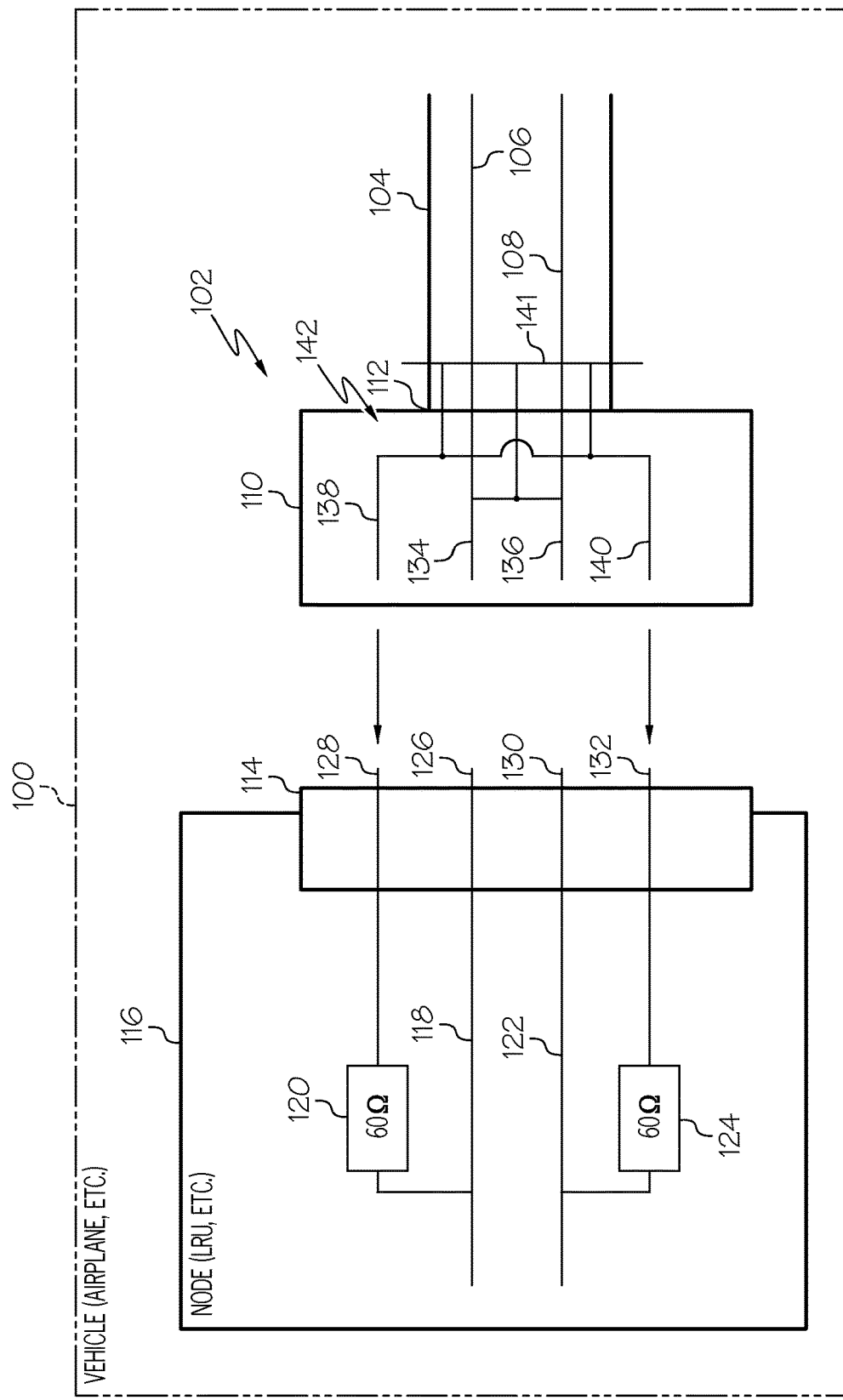
FIG. 1A is a block schematic diagram of an example of a vehicle including a pin-configurable bus termination system illustrating a first termination configuration for terminating a bus in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The exemplary pin-configurable internal bus termination resistor embodiments are described herein as being used in association with CAN buses. However, those skilled in the art will recognize that the embodiments described herein may be easily applied to any type of bus or wiring arrangement. Additionally, the pin-configurable Internal bus termination resistor embodiments are described as being associated with LRUs onboard a vehicle or airplane. However, the pin-configurable internal bus termination resistor arrangement, and principles described herein may be applicable to other systems, environments or applications.

FIG. 1A is a block schematic diagram of an example of a vehicle 100 including a pin-configurable bus termination system 102 illustrating a first termination configuration for terminating a bus 104 in accordance with an embodiment of the present disclosure. The vehicle 100 may be an airplane or other vehicle including communications buses or data buses that interconnect systems or subsystems of the vehicle for communications between the systems or subsystems and for controlling operation of the systems or subsystems. The bus may be a Controller Area Network (CAN) bus that may include a first wire 106 or conductor that may be referred to as a CAN High (CAN-H) wire or conductor and a second wire 108 or conductor that may be referred to as a CAN Low (CAN-L) wire or conductor. The CAN bus may also include a shield wire or conductor, CAN-SHLD, which is not shown in FIG. 1A or FIG. 1B. While the present disclosure describes the pin-configurable bus termination system 102 as being onboard a vehicle 100, such as an airplane, the exemplary pin-configuration bus termination system 102 described herein may be easily adapted for use in any environment or application.

The pin-configurable bus termination system 102 may include a bus connector 110 attached to an end 112 of the bus 104. The bus connector 110 is configured for electrically connecting the bus 104 to an input connector 114 of a node 116 of the vehicle 100. The node 116 may be a line replaceable unit (LRU) or other device. The LRU may be a vehicle or airplane component or component of an airplane system that is modular and designed to be quickly replaced at an operating location, such as an airport or maintenance facility. Examples of LRUs may include but are not necessarily limited to a smoke detector, a radar system, a communications device or system or other systems or subsystems of the vehicle or airplane.

The node 116 or LRU may include a first bus input conductor 118, a first termination resistor 120, a second bus input conductor 122 and a second termination resistor 124. The first termination resistor 120 and the second termination resistor 124 are internal termination resistors and are connected internally within the node 116 or LRU as shown in FIG. 1A. The input connector 114 is configured to receive the bus connector 110 for electrically connecting the bus 104 to the node 116 or LRU. The bus connector 110 when electrically connected to input connector 114 electrically connects the first wire 106 or CAN-H wire of the bus 104 to the first bus input conductor 118 and electrically connects the second wire 108 or CAN-L wire to the second bus input conductor 122.

The input connector 114 may include a first bus input pin 126 and a first termination resistor input pin 128. The first bus input pin 126 is electrically connected to the first bus input conductor 118. The first termination resistor 120 is electrically connected between the first termination resistor input pin 128 and the first bus input conductor 118. The input connector 114 also includes a second bus input pin 130 and a second termination resistor input pin 132. The second bus input pin 130 is electrically connected to the second bus input conductor 122. The second termination resistor 124 is electrically connected between the second termination resistor input pin 132 and the second bus input conductor 122.

Figure 1B:
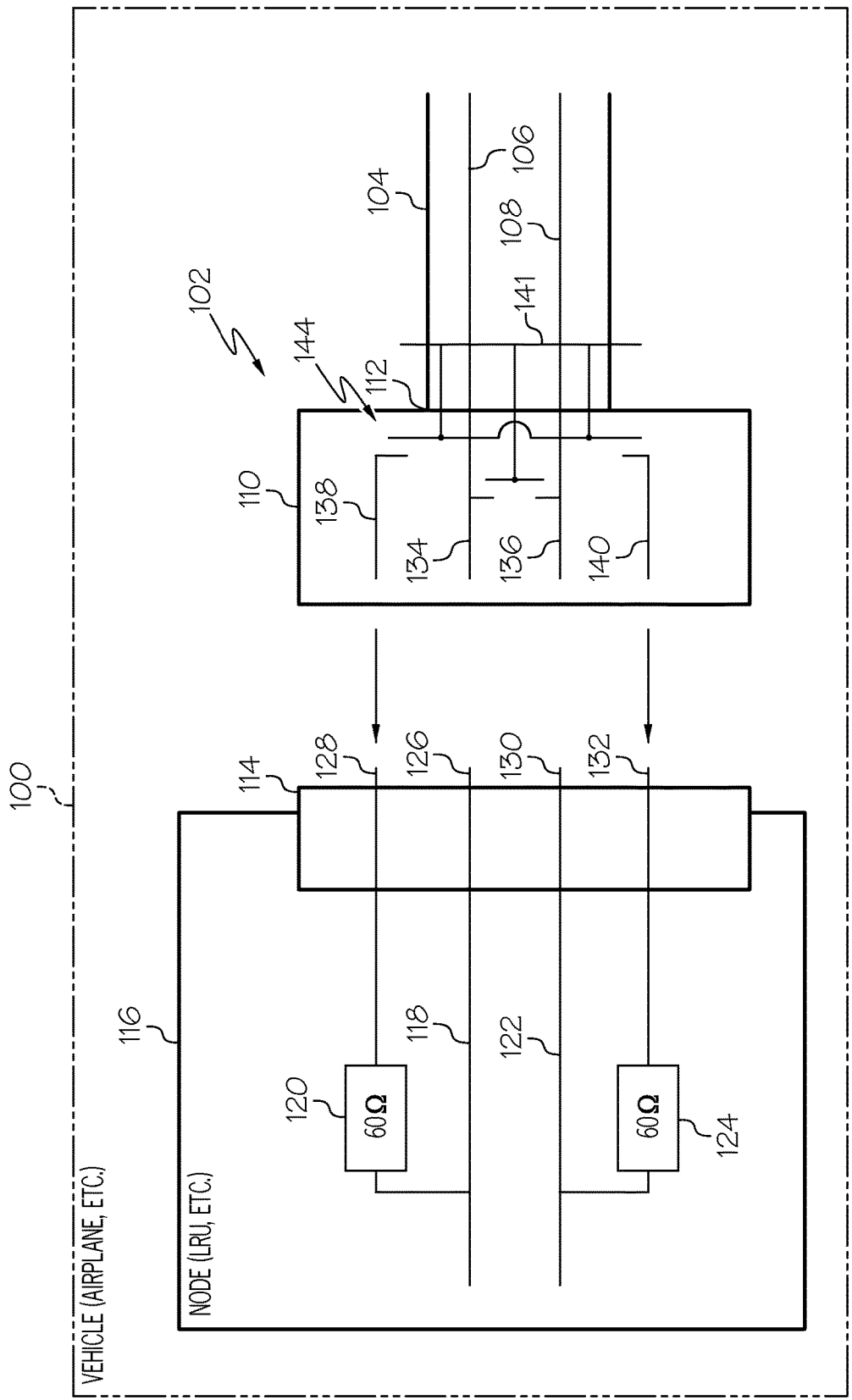
FIG. 1B is a block schematic diagram, of the exemplary vehicle in FIG. 1A including the pin-configurable bus termination system illustrating a second termination configuration in which the termination resistors are not connected for termination of the bus in accordance with an embodiment of the present disclosure.

The bus connector 110 includes a first bus output pin 134 electrically connected to the first wire 106 or CAN-H wire of the bus 104 and a second bus output pin 136 electrically connected to the second wire 108 or CAN-L wire of the bus 104. The bus connector 110 also includes configurable first and second termination resistor output pins 138 and 140. The configurable first and second termination resistor output pins 138 and 140 are configurable to provide a first termination configuration 142 as depicted in FIG. 1A and a second termination configuration 144 as depicted in FIG. 1B. The configurable first and second termination resistor output pins 138 and 140 may be configured by any suitable mechanical means for making the electrical connections shown in FIG. 1A and described herein to provide the first termination configuration 142, or alternatively, the disconnections or open circuit depicted in FIG. 1B and described below to provide the second termination configuration 144. For example, the bus connector 110 may include a single throw multiple pole switch 141 that may be selectively operated to provide either the first termination configuration 142 in FIG. 1A or the second configuration 144 in FIG. 1B. The first termination configuration 142 electrically interconnects the first and second bus output pins 134 and 136, and also, the first termination configuration 142 separately interconnects the configurable first and second termination resistor output pins 138 and 140, to electrically connect the first and second termination resistors 120 and 124 for terminating the bus 104 when the bus connector 110 is electrically connected to the input connector 114. The configurable first and second termination resistor output pins 138 and 140 are configured in the first termination configuration 142 by selectively operating the switch 141 or other suitable mechanism when the node 116 or LRU is connected to the bus 104 at an extreme physical end of the bus 104 or is the last node 116 or LRU connected to the bus 104. The first termination resistor output pin 138 electrically connects to the first termination input pin 128 of node input connector 114 and the second termination, resistor output pin 140 electrically connects to the second termination resistor input pin 132 of the node input connector 114 when the bus connector 110 is electrically connected to the node input connector 114 to terminate the bus 104 with the first and second termination resistors 120 and 124. If the first and second termination resistors 120 and 124 are for terminating a bus having a characteristic impedance of about 120 ohms from combining in series, such as a CAN bus, the first termination resistor and the second termination resistor may each be about 60 ohm resistors. Likewise, the first bus output pin 134 electrically connects to the first bus input pin 126 of the node input connector 114 and the second bus output pin 136 electrically connects to the second bus input pin 130 of the node input connector 114 when the bus connector 110 is electrically connected to the node input connector 114.

Referring also to FIG. 1B, the configurable first and second termination resistor output pins 138 and 140 are configurable to provide the second configuration 144 in response to the node 116 or LRU not being at an end of the bus 104 but rather located at some intermediate location along the bus 104. The second configuration 144 provides an open electrical circuit between the first and second bus output pins 134 and 136 and also an open electrical circuit between the configurable first and second termination resistor output pins 138 and 140 as shown in FIG. 1B. FIG. 1B is a block schematic diagram of the exemplary vehicle 100 including the pin-configurable bus termination system 102 illustrating the second configuration 144 in which the termination resistors 120 and 124 are not connected for termination of the bus 104 in accordance with an embodiment of the present disclosure. The configurable first and second termination resistor output plus 138 and 140 are selectively configured in the second configuration 144 by operating the switch 141 or other mechanism when the node 116 or LRU is not at an extreme end of the bus 104 or is the last node 116 or LRU connected to the bus 104.

Figure 2:
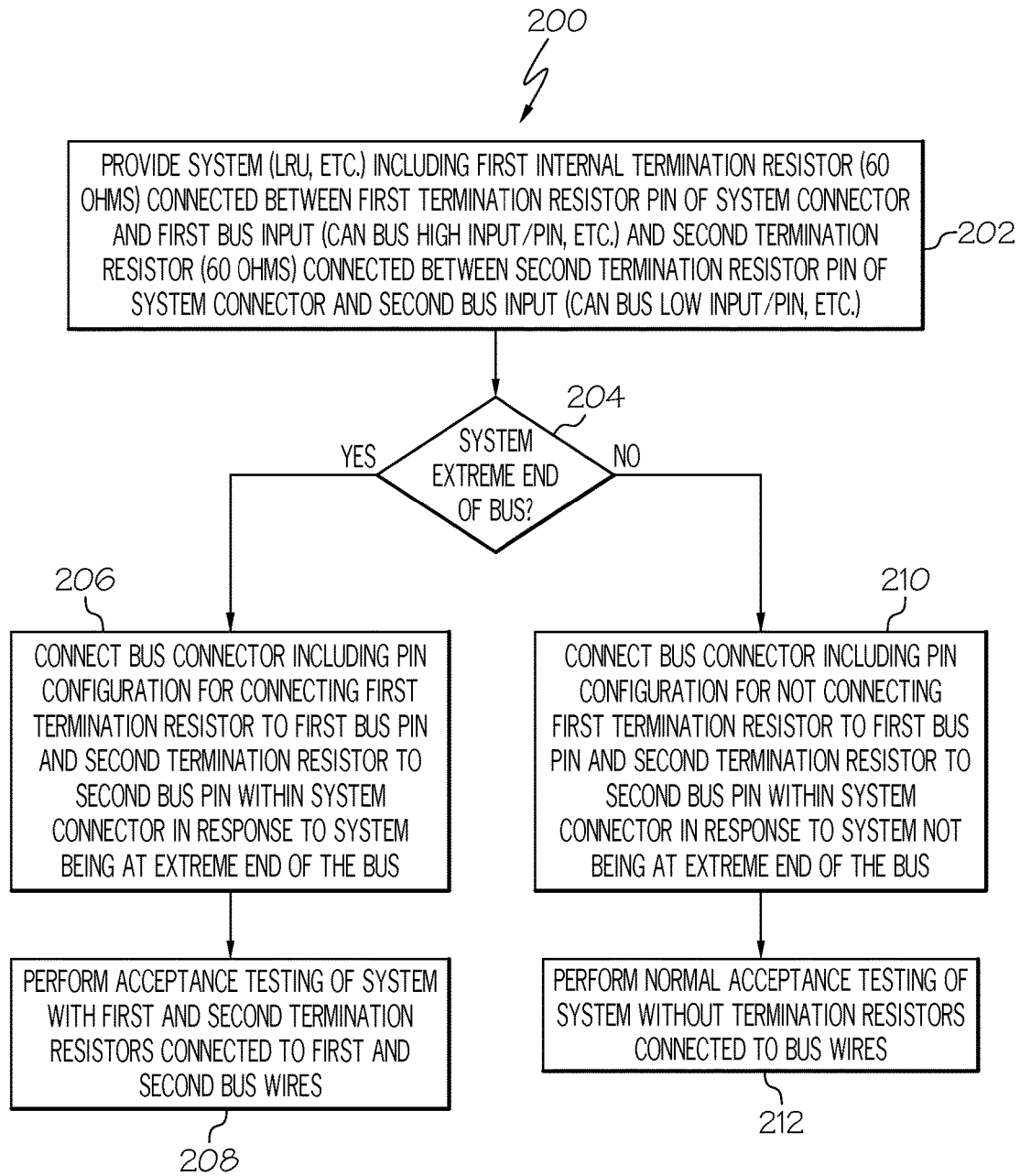
FIG. 2 is a flow chart of an exemplary, method for configuring pin-configurable internal bus termination resistors in accordance with an embodiment of the present disclosure.

FIG. 2 is a flow chart of an exemplary method 200 for configuring pin-configurable internal bus termination resistors for terminating a bus in accordance with an embodiment of the present disclosure. In block 202, a node may be provided including a first internal termination resistor and a second internal termination resistor. The first internal termination resistor may be electrically connected between a first termination resistor pin of an input connector of the node and a first bus input conductor of the node. The second termination, resistor may be connected between a second termination resistor pin of the input connector of the node and a second bus input conductor of the node. The node may be a LRU or similar component of a vehicle, such as an airplane. If the first and second termination resistors are for terminating a bus having a characteristic impedance of about 120 ohms, such as a CAN bus, the first termination resistor and the second termination resistor may each be about 60 ohm resistors.

In block 204, a determination may be made whether the node is at an extreme physical end of the bus or is the last node connected to the bus. If the node is connected at an extreme physical end of the bus, the method 200 may advance to block 206. In block 206, pins of a bus connector may be configured to provide a first configuration in response to the system being located at the end of the bus. The first configuration may include electrically interconnecting configurable first and second termination resistor pins and first and second bus output pins of the bus connector. The bus connector is configured for electrically connecting the bus to the input connector of the node.

In block 208, performance acceptance testing may be performed on the node with the first and second termination resistors connected to the first and second wires of she bus to terminate the bus. The bus may be a CAN bus. Accordingly, to the first bus wire may be a CAN high wire of the CAN bus and the second bus may be a CAN low wire of the CAN bus. The bus connector is configured in the first termination configuration with the configurable first termination resistor pin electrically connected to the CAN high wire or conductor of the CAN bus and the configurable second termination resistor pin electrically connected to the CAN low wire or conductor of the CAN bus. The first and second termination resistors are then respectively connected to the CAN high wire and CAN low wire of the CAN bus to terminate the bus.

Referring back to block 204, if the node is not connected to the bus at an extreme physical end of the bus, the method 200 may advance to block 210. In block 210, pins of the bus connector may be configured to provide a second termination configuration in response to the node not being located at the end of the bus but rather the system is connected at some intermediate location along the bus. The second termination configuration may include providing an open electrical circuit between the first and second bus output pins and the configurable first and second termination resistor pins of the bus connector.

In block 212, normal performance acceptance testing of the node may be performed without the termination resistors being connected to the bus wires for termination of the bus.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware.

The terminology used herein is for t be purpose of describing particular embodiments only and is not intended to be limiting of embodiments of the invention. As used herein, the singular forms "a", "an" and "the" are intended to include the plural loons as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of ah means or step plus function elements in the claims below are intended to include any structure, material or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing, from the scope and spirit of embodiments of the invention. The embodiment was chosen and described in order to best explain the principles of embodiments of the invention and the practical application, and to enable others of ordinary skill in the art to understand embodiment of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A pin-configurable bus termination system, comprising:
a bus connector attached to an end of a bus, the bus connector being configured for electrically connecting the bus to an input connector of a node, the node comprising an internal bus termination resistance that is optionally connected based on a selected configuration of the bus connector, the bus connector comprising:
   a first bus output pin;
   a second bus output pin; and
   configurable first and second termination resistor pins, the configurable first and second termination resistor pins being configurable to provide a first termination configuration that electrically interconnects the first and second bus output pins and interconnects the configurable first and second termination resistor pins, to electrically connect the internal bus termination resistance for terminating the bus, and the configurable first and second termination resistor pins being configurable to provide a second termination configuration comprising an open electrical circuit between the first and second bus output pins and an open electrical circuit between the configurable first and second termination resistor pins.

2. The pin-configurable bus termination system of claim 1, wherein the input connector of the node comprises:
a first termination resistor pin electrically connected to a first bus input conductor of the node by a first termination resistor; and
a second termination resistor pin electrically connected to a second bus input conductor of the node by a second termination resistor, wherein the first termination resistor pin is configured to electrically connect to the configurable first termination resistor pin and the second termination resistor pin is configured to electrically connect to the configurable second termination resistor pin when the bus connector is electrically connected to the input connector of the system, the first termination resistor and the second termination resistor combine in series to provide the internal bus termination resistance when the configurable first and second termination resistor pins are configured to provide the first termination configuration.

3. The pin-configurable bus termination system of claim 2, wherein the first termination resistor and the second termination resistor each comprise a resistance of approximately 60 ohms.

4. The pin-configurable bus termination system of claim 1, wherein the node comprises:
a first bus input conductor;
a first termination resistor;
a second bus input conductor;
a second termination resistor; and
the input connector, the input connector comprising:
   a first bus input pin electrically connected to the first bus input conductor;
   a first termination resistor input pin, wherein the first termination resistor is electrically connected between the first termination resistor input pin and the first bus input conductor;
   a second bus input pin electrically connected to the second bus input conductor; and
   a second termination resistor input pin, wherein the second termination resistor is electrically connected between the second termination resistor input pin and the second bus input conductor, the first termination resistor and the second termination resistor combine in series to provide the internal bus termination resistance when the configurable first and second termination resistor pins are configured to provide the first termination configuration.

5. The pin-configurable bus termination system of claim 1, wherein the bus comprises a controller area network (CAN) bus and the first bus output pin is electrically connected to a CAN high wire of the CAN bus and the second bus output pin is electrically connected to a CAN low wire of the CAN bus.

6. The pin-configurable bus termination system of claim 1, wherein the bus comprises a CAN bus configured for use on an airplane.

7. The pin-configurable bus termination system of claim 1, wherein the node comprises a line replaceable unit (LRU) onboard an airplane.

8. The pin-configurable bus termination system of claim 1, wherein the configurable first and second termination resistor pins are configured in the first configuration in the response to the node being positioned at an end of the bus.

9. The pin-configurable bus termination system of claim 1, wherein the bus comprises a CAN bus and the node comprises an LRU, wherein the configurable first and second termination resistor pins are configured in the first configuration in response to the LRU being positioned at an end of the CAN bus and the configurable first and second termination resistor pins are configured in the second configuration in response to the LRU not being at an end of the CAN bus.

10. A pin-configurable bus termination system, comprising:
a bus connector attached to an end of a bus;
a node comprising:
   a first bus input conductor;
   a first termination resistor;
   a second bus input conductor;
   a second termination resistor;
   an input connector, the input connector being configured to receive the bus connector for connecting the bus to the node, the input connector comprising:

a first bus input pin electrically connected to the first bus input conductor;

a first termination resistor input pin, wherein the first termination resistor is electrically connected between the first termination resistor input pin and the first bus input conductor;

a second bus input pin electrically connected to the second bus input conductor;

a second termination resistor input pin, wherein the second termination resistor is electrically connected between the second termination resistor input pin and the second bus input conductor; and wherein the bus connector comprises:

a first bus output pin;

a second bus output pin; and configurable first and second termination resistor output pins, the configurable first and second termination resistor output pins being configurable to provide a first termination configuration that electrically interconnects the first and second bus output pins and interconnects the configurable first and second termination resistor output pins, to electrically connect the first and second termination resistors for terminating the bus, and the configurable first and second termination resistor output pins being configurable to provide a second termination configuration that provides an open electrical circuit between the first and second bus output pins and an open electrical circuit between the configurable first and second termination resistor output pins.

11. The pin-configurable bus termination system of claim 10, wherein the bus comprises a CAN bus and the first bus output pin is electrically connected to a CAN high wire of the CAN bus and the second bus output pin is electrically connected to a CAN low wire of the CAN bus.

12. The pin-configurable bus termination system of claim 10, wherein the bus comprises a CAN bus onboard an airplane.

13. The pin-configurable bus termination system of claim 10, wherein the node comprises an LRU onboard an airplane.

14. The pin-configurable bus termination system of claim 10, wherein the configurable first and second termination resistor output pins are configured in the first configuration in response to the system being positioned at an end of the bus.

15. The pin-configurable bus termination system of claim 10, wherein the bus comprises a CAN bus and the node comprises an LRU, wherein the configurable first and second termination resistor output pins are configured in the first termination configuration in response to the LRU being positioned at an end of the CAN bus and the configurable first and second termination resistor pins are configured in the second termination configuration in response to the LRU not being at an end of the CAN bus.

16. A method for configuring termination of a bus, comprising:

electrically connecting a first internal termination resistor between a first termination resistor pin of an input connector of a node and a first bus input conductor of the node;

electrically connecting a second internal termination resistor between a second termination resistor pin of the input connector and a second bus input conductor of the node;

determining if the node is located at an end of the bus;

configuring a bus connector to provide a first termination configuration in response to the node being located at the end of the bus, the first termination configuration comprising electrically interconnecting configurable first and second termination resistor pins and interconnecting first and second bus output pins of the bus connector; and configuring the bus connector to provide a second termination configuration in response to the node not being located at the end of the bus, the second termination configuration comprising providing an open electrical circuit between the first and second bus output pins and an open electrical circuit the configurable first and second termination resistor pins.

17. The method of claim 16, wherein the node comprises an LRU, the method further comprising providing the LRU comprising the first internal termination resistor electrically connected between the first termination resistor pin of the input connector and the first bus input conductor and the second internal termination resistor electrically connected between the second termination resistor pin of the input connector and the second bus input conductor.

18. The method of claim 16, wherein the bus comprises a CAN bus, the method further CAN bus, the method further comprising electrically connecting the configurable first termination resistor pin to a CAN high wire of the CAN bus and electrically connecting the configurable second termination resistor pin to a CAN low ire of the CAN bus.

19. The method of claim 16, wherein the first termination resistor and the second termination resistor each comprise a resistance of approximately 60 ohms.

20. The method of claim 16, wherein the bus and node are onboard an airplane.

* * * * *

UNITED STATES PATENT AND TRADEMARK OFFICE
CERTIFICATE OF CORRECTION

PATENT NO. : 10,282,340 B2
APPLICATION NO. : 14/573322
DATED : May 7, 2019
INVENTOR(S) : Todd B. Brouwer et al.

It is certified that error appears in the above-identified patent and that said Letters Patent is hereby corrected as shown below:

In the Claims

In Column 8, Line 46, in Claim 8, delete "first configuration in the" and insert -- first configuration in --, therefor.

In Column 10, Line 29, in Claim 16, delete "electrical circuit the configurable" and insert -- electrical circuit between the configurable --, therefor.

In Column 10, Line 40, in Claim 18, delete "the method further CAN bus,", therefor.

In Column 10, Line 44, in Claim 18, delete "ire" and insert -- wire --, therefor.

Signed and Sealed this
Nineteenth Day of November, 2019

Andrei Iancu
*Director of the United States Patent and Trademark Office*